March 15, 1949.	H. MAUND ET AL	2,464,332
COUPLING
Filed Feb. 26, 1944
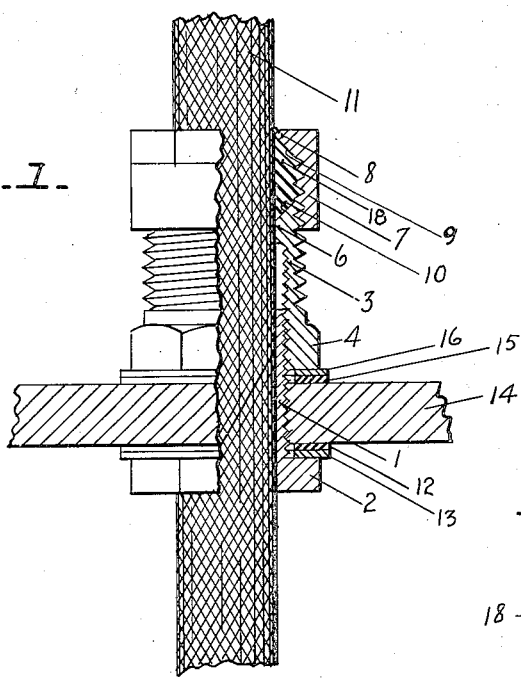
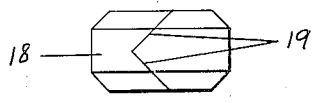
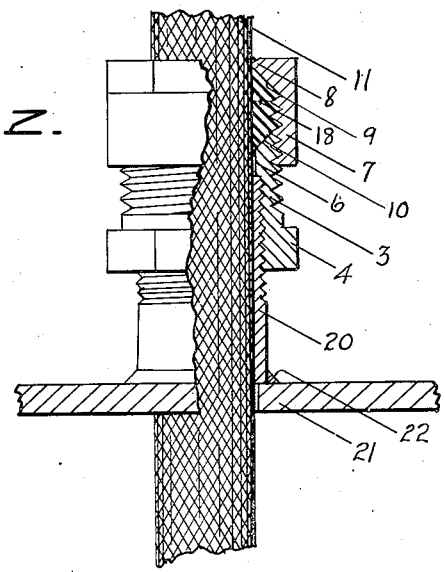
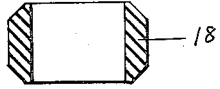
INVENTORS
HAROLD MAUND
HARRY REITER
BY
Boykin, Mohler & Beckley
ATTORNEYS.

Patented Mar. 15, 1949

2,464,332

UNITED STATES PATENT OFFICE 2,464,332

COUPLING

Harold Maund and Harry Reiter, San Francisco, Calif., assignors to Expediters Ltd., San Francisco, Calif., a copartnership Application February 26, 1944, Serial No. 524,034

2 Claims. (Cl. 285—30)

This invention relates to fixture, bulkhead and kickpipe tubes for providing waterproof seals at the points where electrical conduits pass through walls of water-tight fixture boxes, or through bulkheads or decks.

At the present time in fixture boxes, bulkheads and decks the conventional seals are ordinary packing boxes having a female part into which is screwed the male packing gland. After the conduit, which may be of the armoured type, or which may have a woven metal sheath as indicated in the drawings hereinafter described, is passed through the packing box the packing is wound around the conduit and is tamped into the female part of the box. This winding and tamping continues until the operator is of the opinion that enough packing is used, and then the gland is screwed into the box to and into engagement with the packing. If insufficient packing has been used, the gland is removed and more packing is inserted and the gland is again screwed into place. After it appears likely that sufficient packing is in the box the same is tested for leakage under a predetermined liquid pressure, the usual minimum pressure being about 8 lbs. per square inch. Should the packing fail at this pressure even after tightening the gland, the whole process of winding, tamping and screwing of the gland back into the box is repeated after the gland is first removed.

There is a great loss in time required to make a seal by the above described method where the installations are in a relatively open space and manipulation is easy, and this loss is magnified many times where the tubes may be close together and in relatively inaccessible places, as frequently occurs.

With our invention the above described laborious procedure is eliminated and fixture, bulkhead and kickpipe tubes are installed and sealed relative to the electrical conduits in only a fraction of the time heretofore required.

One of the objects of this invention is the provision of fixture, bulkhead and kickpipe tubes, and the like, that overcome the objections of conventional tubes as described above, and which tubes include an improved packing that is simple and easy to install and that is more efficient than conventional fibrous packing.

Other objects and advantages will appear in the description that follows, and in the drawings annexed hereto.

In the drawings,

Fig. 1 is a part sectional, part elevational view of a fixture or bulkhead tube with the conduit extending therethrough and with such tube secured to a fixture box wall or bulkhead.

Fig. 2 is a part sectional, part elevational view of a kickpipe tube secured on a deck, or the like, and showing the conduit extending therethrough.

Figs. 3, 4 are respectively an elevational side view and a vertical sectional view through one of the packing units used in Figs. 1, 2.

In detail, the tube of Fig. 1 comprises an inner tubular member 1 that is formed with a radially outwardly projecting flange 2 at one end thereof, which flange may be square or hexagonal for engagement by a wrench. The member 1 is externally threaded and an intermediate internally threaded sleeve 3 is threadedly secured thereon and projects from the end of member 1 that is opposite flange 2.

Sleeve 3 is also externally threaded and may have a slight flange 4 at its end that is adjacent flange 2, which flange may also be square or hexagonal in contour for engagement by a wrench. The opposite end of sleeve 3 projects from the member 1 and is formed with a radially inwardly projecting rib 6.

Threadedly secured on the projecting end of sleeve 3 is an internally threaded tubular cap 7 that projects from said sleeve. The projecting end of cap 7 is formed with a radially inwardly projecting flange 8.

The rib 6 and flange 8 are preferably of about the same inside diameter and said diameter is preferably about the same as the inside diameter of member 1. The adjacent sides 9, 10 of flange 8 and rib 6 respectively, are beveled to face generally toward their common central axis. The diameter of rib 6, flange 8, and member 1 is such as to relatively freely pass an electrical conduit 11.

In installing the tube assembly above described, the member 1 with a gasket 12 and a washer 13 thereon may first be inserted through an opening formed for such member in a wall 14. The gasket may be of synthetic rubber or a rubber-like resin and is adjacent wall 14 while the washer is adjacent flange 2. Sleeve 3 may then be threaded onto the end of member 1 that projects through said wall 14, and a gasket 15 and washer 16 respectively similar to gasket 12 and washer 13 may be positioned on member 1 between the flange 4 of sleeve 3 and wall 14 with the gasket 15 adjacent said wall. Upon screwing sleeve 3 on member 1 until flanges 2, 4 tightly compress the gaskets against wall 14, a tight waterproof seal is made between the wall and the fixture or bulkhead tube, as the case may be.

The conduit 11 may be passed through the member 1, sleeve 3, and cap 7, but before the latter is threaded onto sleeve 3 a split pressure deformable packing ring 18 is positioned around the conduit and adjacent side 10 of rib 6, or the ring may be in cap 7 and the latter on sleeve 3 before the conduit is inserted provided the ring is not compressed between the flange 8 and rib 6.

The ring 18 has its ends beveled to correspond with sides 9, 10 of flange 8 and rib 6 respectively. Upon tightening the cap on the sleeve the ring is forced against the conduit, and as the material of the ring is preferably a relatively soft, cold flowing plastic, such as may be produced from vinyl chloride and vinyl acetate and marketed under the trade-name of "Vinylite," some of the material will be forced between the radially facing edges of flange 8, rib 6 and the outer sides of the conduit 11 to insure a tight seal at such edges. Ring 18 is also preferably split along convergent lines 19 of equal length meeting centrally of the length of the ring axially thereof thus insuring equal pressure against opposite ends of the ring during axial compression of the latter.

In Fig. 2 is illustrated a kickpipe tube. These tubes are on decks in axial alignment with holes therein for passage of electrical conduits therethrough. Inasmuch as the tube, structurally, is identical with the fixture and bulkhead tube except for the provision of a nut-like flange on the inner tubular member of the assembly, the same members will be used except that which directly designates said inner tubular member, and which member is designated 20 in Fig. 2.

This inner tubular member 20 is welded at one end to deck 21 by welding 22 and the exteriorly threaded end remote from the welded end carries the intermediate sleeve 3 which in turn is formed with the rib 6 that has beveled side 10 in engagement with one beveled end of ring 18. The opposite end of ring 18 is adapted to engage the beveled side 9 of flange 8 that is on the cap 7. Compression of ring 18 by tightening of cap 7 on sleeve 3 forces the packing ring into sealing engagement with conduit 11 and the material of the ring is also squeezed between the radially inner edges of rib 6, flange 8 and the outer sides of conduit 11.

The flange 4 on sleeve 3 is merely used in this form of invention for engagement by wrench jaws to screw the sleeve on member 20, whereas in Fig. 1 the flange served also as a backing for the sealing gasket 15 and washer 16.

In actual practice, the tightening of the cap 7 on sleeve 3 for compressing the ring 18 between rib 6 and flange 8 readily and practically without exception provides a seal with the conduit 11 that will withstand a liquid pressure such as water, of from 30 to 40 lbs. per square inch, which is far above the minimum requirements for seals of this nature.

Preferably gaskets 12, 15 of Fig. 1 are of the same material as that of ring 18 and the washers may be of metal.

The proportions of the various elements may obviously be modified to suit the circumstances, such as shortening or lengthening the members 1, 20, sleeve 3, or cap 7.

Having thus described the invention, we claim:

1. A tube of the character described comprising an inner exteriorly threaded tubular member, an intermediate internally and externally threaded sleeve threadedly secured on said member and projecting from one end thereof, an outer interiorly threaded cap threadedly secured on said sleeve and projecting from the projecting end of the latter, the projecting ends of said sleeve and cap being respectively formed with an annular radially inwardly projecting rib and flange of substantially the same internal diameter as that of said inner member, and an annular preformed pressure-deformable split packing ring disposed between said flange and rib adapted to be forced radially inwardly against a conduit adapted to extend through said member sleeve and cap upon screwing said cap on said sleeve, a radially outwardly projecting flange on said inner member and on said sleeve at the ends thereof remote from the projecting end of said sleeve for engaging opposite sides of a wall having an opening through which said tubular member is adapted to extend, the adjacent sides of said rib and said flange being beveled to face generally toward their common central axis, and said packing ring being a compound of vinyl chloride and vinyl acetate, and said ring being split along divergent lines of equal length meeting centrally of the length of said ring axially thereof and terminating at points along the beveled end edges of said ring that are opposite each other.

2. A tube of the character described comprising a first tubular member formed with a radially inwardly projecting annular flange at one end thereof and interiorly threaded at the opposite end, a second tubular member externally threaded at one end and threadedly engaged at said one end with the interior threads on said first tubular member, means at the opposite end of said second tubular member adapted for securing the latter to a wall in axial alignment with a hole formed in such wall, the end of said second member adjacent said flange and the side of said flange adjacent said end being beveled to face generally toward the common axis of said members, an annular preformed pressure-deformable packing ring of resilient waterproof plastic composition material between the said beveled surfaces having opposite outwardly axially facing surfaces substantially conforming in contour to the said beveled surfaces, said ring being split along divergent lines of equal length meeting centrally of the length of said ring axially thereof and terminating at points along the lateral edges of said ring that are opposite each other.

HAROLD MAUND.
HARRY REITER.

REFERENCES CITED

The following references are of record in the file of this patent:

UNITED STATES PATENTS

| Number | Name | Date |
| --- | --- | --- |
| 473,461 | Hogan | Apr. 26, 1892 |
| 738,503 | Waters | Sept. 8, 1903 |
| 1,391,396 | McMurtrie | Sept. 20, 1921 |
| 1,755,104 | Deierlein | Apr. 15, 1930 |